United States Patent
Boss et al.

(10) Patent No.: US 7,849,114 B2
(45) Date of Patent: Dec. 7, 2010

(54) METHOD, SYSTEM, AND PROGRAM PRODUCT FOR GENERATING A VIRTUAL DATABASE

(75) Inventors: Gregory J. Boss, American Fork, UT (US); Rick A. Hamilton, II, Charlottesville, VA (US); Kevin C. McConnell, Austin, TX (US); John W. Miller, Suwanee, GA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 11/424,938

(22) Filed: Jun. 19, 2006

(65) Prior Publication Data

US 2007/0294215 A1    Dec. 20, 2007

(51) Int. Cl.
*G06F 17/30* (2006.01)
(52) U.S. Cl. .................. 707/831; 707/802; 707/821; 707/790
(58) Field of Classification Search ............. 707/1, 707/2, 100, 102, 831, 705, 790, 802
See application file for complete search history.

(56) References Cited

U.S. PATENT DOCUMENTS

| | | | |
|---|---|---|---|
| 5,806,062 A | 9/1998 | Chen et al. | |
| 5,983,232 A | 11/1999 | Zhang | |
| 6,108,671 A | 8/2000 | Ogawa | |
| 6,505,188 B1 | 1/2003 | Ghazal et al. | |
| 2001/0034822 A1 | 10/2001 | Weinreb et al. | |
| 2003/0004960 A1 | 1/2003 | Pressmar | |
| 2003/0065620 A1 | 4/2003 | Gailey et al. | |
| 2003/0204505 A1 | 10/2003 | Cotner et al. | |
| 2005/0120342 A1* | 6/2005 | Saracco et al. | 717/162 |
| 2005/0160104 A1* | 7/2005 | Meera et al. | 707/100 |
| 2006/0224557 A1* | 10/2006 | Gupta | 707/1 |
| 2006/0242189 A1* | 10/2006 | Leetaru et al. | 707/102 |
| 2007/0260628 A1* | 11/2007 | Fuchs et al. | 707/101 |
| 2007/0271618 A1* | 11/2007 | Chao et al. | 726/27 |

* cited by examiner

*Primary Examiner*—Mohammad Ali
*Assistant Examiner*—Thuy (Tiffany) Bui
(74) *Attorney, Agent, or Firm*—William E. Schiesser; Hoffman Warnick LLC

(57) ABSTRACT

The present invention provides a virtual database as well as a method, system, and program product for generating a virtual database. Specifically, under the present invention, Service Data Objects (SDOs) corresponding to a plurality of database tables are provided within a virtual container. Once provided, two or more of the SDOs are interrelated to yield the virtual database (having a Virtual Bounded Persistent Memory). In accordance with the present invention, the database tables can be stored within a single (e.g., conventional) database, or databases. In addition, the virtual database can be generated and removed on-demand. Still yet, the virtual database of the present invention can be queried using standard Structured Query Language (SQL) queries.

24 Claims, 6 Drawing Sheets

METHOD, SYSTEM, AND PROGRAM PRODUCT FOR GENERATING A VIRTUAL DATABASE

FIELD OF THE INVENTION

In general, the present invention relates to a virtual database. Specifically, the present invention relates to a method, system, and program product for generating a virtual database.

BACKGROUND OF THE INVENTION

Today, it is common to migrate data from system to system so that critical business information can be extracted by relating data together (e.g. related financial data with manufacturing data, customer service data with installed inventory data, etc.). It is apparent that the current appetite/creativity to relate more and more disparate data domains is indirectly causing (using "traditional/familiar database technologies") information technology (IT) costs to keep spiraling upwards. Using today's standard relational database technologies, and the exploding needs to relate disparate data groups/domains of information together, the IT cost of running an operation will inevitably and rapidly go up proportionally to the increased need for business intelligence needed to run the enterprise.

Under current approaches, data warehouses are confined to using a traditional relational database technology to store data. In the case of a virtual data mart, SQL views are used to create a "specialized" query. When using data warehouses or data marts, the operator has to move data from various sources. In every case, enterprises are forced to spend significant time and resources physically moving the data into a traditional relational database. Such a process can be frustratingly slow and cumbersome.

FIG. 1 shows a legacy method for accessing a database or series of databases 10A-B. Typical protocols used to interface with databases 10A-B are ODBC and JDBC, which allow for an application server 12 to access the Finite Bounded Persistent Memories (FBPMs) 14A-B of each separate database 10A-B. Some of the major limitations of this legacy method lie in the duplication of data that occurs as database operations are performed.

In view of the foregoing, there exists a need for an approach that solves at least one of the deficiencies in the related art.

SUMMARY OF THE INVENTION

In general, the present invention provides a virtual database as well as a method, system, and program product for generating a virtual database. Specifically, under the present invention, Service Data Objects (SDOs) corresponding to a plurality of database tables are provided within a virtual container. Once provided, two or more of the SDOs are interrelated to yield the virtual database (having a Virtual Bounded Persistent Memory). In accordance with the present invention, the database tables can be stored within a single (e.g., conventional) database, or among multiple databases. In addition, the virtual database can be generated and removed on-demand. Still yet, the virtual database of the present invention can be queried using standard Structured Query Language (SQL) queries. In any event, the present invention allows, among other things, data to be manipulated without having to move the data from one database (or table) to another.

A first aspect of the present invention provides a method for generating a virtual database, comprising: providing, in a virtual container, Service Data Objects (SDOs) for each of a plurality of database tables; and interrelating at least two of the SDOs in the virtual container to yield the virtual database.

A second aspect of the present invention provides a system for generating a virtual database, comprising: a system for providing, in a virtual container, Service Data Objects (SDOs) for each of a plurality of database tables; and a system for interrelating at least two of the SDOs in the virtual container to yield the virtual database.

A third aspect of the present invention provides a program product stored on a computer readable medium for generating a virtual database, the computer readable medium comprising program code for causing a computer system to perform the following steps: providing, in a virtual container, Service Data Objects (SDOs) for each of a plurality of database tables; and interrelating at least two of the SDOs in the virtual container to yield the virtual database.

A fourth aspect of the present invention provides a method for deploying an application for generating a virtual database, comprising: providing a computer infrastructure being operable to: provide, in a virtual container, Service Data Objects (SDOs) for each of a plurality of database tables; and interrelate at least two of the SDOs in the virtual container to yield the virtual database.

A fifth aspect of the present invention provides a virtual database comprising: a virtual container; and a plurality of Service Data Objects (SDOs) corresponding to plurality of database tables stored in the virtual container, wherein at least two of the SDOs are interrelated within the virtual container.

A sixth aspect of the present invention provides computer software embodied in a propagated signal for generating a virtual database, the computer software comprising instructions for causing a computer system to perform the following steps: providing, in a virtual container, Service Data Objects (SDOs) for each of a plurality of database tables; and interrelating at least two of the SDOs in the virtual container to yield the virtual database.

A seventh aspect of the present invention provides a business method for generating a virtual database.

Therefore, the present invention provides a virtual database as well as a method, system, and program product for generating a virtual database.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

BEST MODE FOR CARRYING OUT THE INVENTION

Figure 1:
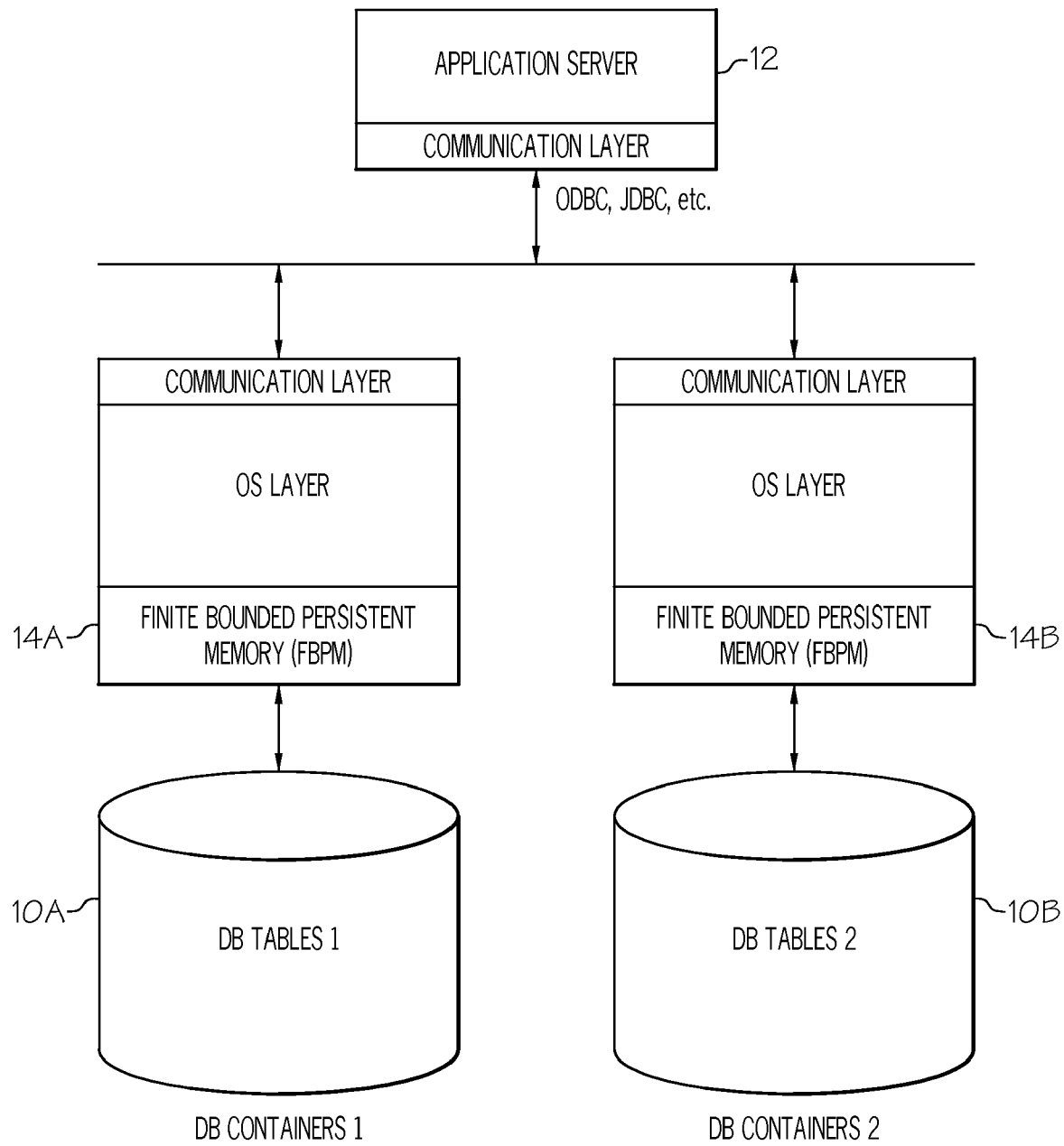
FIG. 1 depicts a legacy method for accessing databases in accordance with the prior art.

For convenience, the Best Mode for Carrying out the Invention has the following sections:
I. General Description
  A. Service Data Object Background
  B. Illustrative Embodiments
II. Computerized Implementation I. General Description The present invention provides a virtual database as well as a method, system, and program product for generating a virtual database. Specifically, under the present invention, Service Data Objects (SDOs) corresponding to a plurality of database tables are provided within a virtual container. Once provided, two or more of the SDOs are interrelated to yield the virtual database (having a Virtual Bounded Persistent Memory). In accordance with the present invention, the database tables can be stored within a single (e.g., conventional) database, or databases. In addition, the virtual database can be generated and removed on-demand. Still yet, the virtual database of the present invention can be queried using standard Structured Query Language (SQL) queries. In any event, the present invention allows, among other things, data to be manipulated without having to move the data from one database (or table) to another.

The present invention proposes that the previous notions of a finite bounded persistent memory (FBPM) (e.g. Hard Disk, section of shared memory, etc.) can become virtualized. This virtualization will allow tables from widely distributed database(s) (not necessarily relational in nature) to be aggregated in virtual space to form a virtual bounded persistent memory (VBPM) instance. Using this substrate, a standard database management system would be adapted to allow for standard ANSI SQL-92 commands and management functions to be built on top of it. The benefits of creating virtual (service) databases include the ability to: (1) aggregate disparate grouping of data in a private virtual space; (2) establish relationships between the data in the virtual space; (3) prevent the data contained in the FBPM (e.g. the real hard disk bounded data) from having to be moved around the network like it is today; (4) execute SQL commands such as SQL Select commands against the virtual database, and not have to pass the commands through to the underlying system like today's Integrator products (e.g. DB2 II); and (5) pass insertion and updating of records through to the underlying associated tables of the FBPMs that make up the VBPM.

Unlike a Data Warehouse/Mart a virtual database can be composed of disparate data from many different sources (e.g., SDOs can be built to directly interact not only with databases, but also Messaging-Oriented Middleware (MOM)s, data feeds (RSS), and Legacy systems [IMS, VSAM, ISAM]) without moving the data. Using the Data Mediator Services (DMS) technology, relationships (Metadata) can be layered on top of a DMS that manages a collection of SDOs and enable information query through standard ANSI SQL, and normal SQL Create Retrieve Update Delete (CRUD) can be executed in this "On-Demand" database. Not only does this provide basic SQL operations, but it also enables views, transaction support and everything else that is possible with a FBPM database.

A. Service Data Object Background

The Service Data Object (SDO) specification is gaining wide-spread adoption in service-oriented architectures. Within the SDO specification, a data graph is provided. A data graph is generally a graph of related objects known as SDOs. For example, for an electronic file system, a hierarchical data graph can be generated in which individual data objects are represented and interrelated with one another. The SDO specification and the Eclipse Modeling Framework (EMF) reference implementation define a common set of Application Programming Interfaces (APIs) and data objects that allow for a common programming methodology across heterogeneous data repositories. The SDO specification allows for disconnected data graphs to be retrieved, changed, and then persisted by means of a "mediator."

B. Illustrative Embodiments

Figure 2:
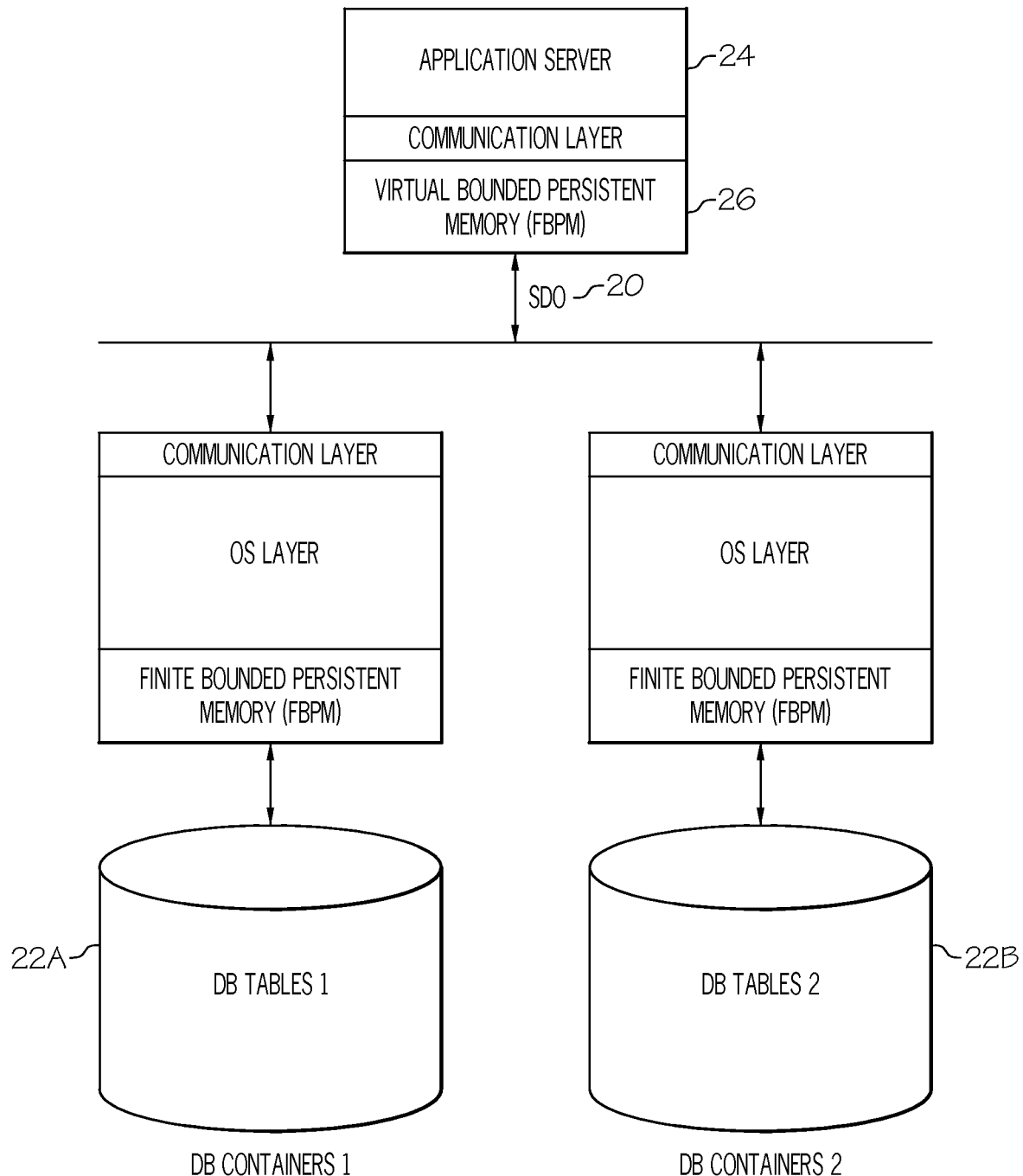
FIG. 2 depicts the use of SDOs in conjunction with multiple databases in accordance with the present invention.

Referring now to FIG. 2, the use of SDOs 20 in conjunction with multiple databases 22A-B is depicted in accordance with the present invention. As will be further shown below, under the present invention, an SDO is provided for each database table that is desired to be connected and/or accessed. These SDOs are provided in a virtual container/space, shown in FIG. 2 as VBPM 26, which is accessible directly from application server 24. Further, the VBPM can be queried (e.g., through an interface) using standard SQL queries. This prevents multiple databases from having to be accessed for queries as well as data from having to be moved around.

Figure 3:
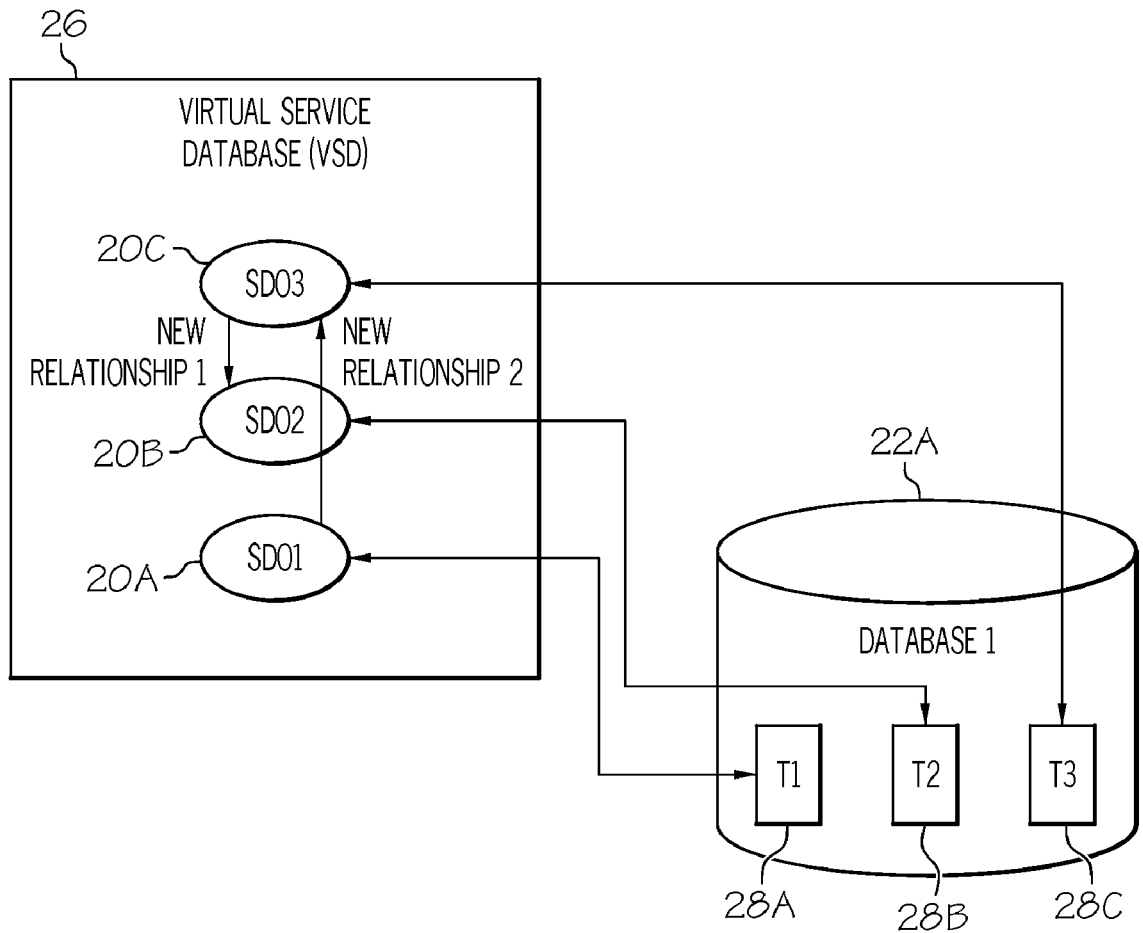
FIG. 3 depicts the provision of SDOs within a virtual container for database tables that are stored in a single database in accordance with the present invention.

Referring now to FIG. 3, the provision of SDOs 20A-C within a virtual service database 26 (container) for database tables 28A-C that are stored in a single database 22A in accordance with the present invention is depicted. In a typical embodiment, a single, unique SDO 20A-C is provided and associated with each database table 28A-C. In an alternate embodiment not shown, a single SDO could be provided and associated with multiple database tables. In any event, for the embodiment shown in FIG. 3, once the SDOs 20A-C are provided within virtual container 26, they will be interrelated with one another. In interrelating SDOs 20A-C, it should be noted that all SDOs 20A-C do not need to be interrelated with every other SDO 20A-C (although this could be done). For example, as illustrated, SDO 20A is interrelated with SDO 20C, which itself is interrelated with SDO 20B. Assume in an illustrative example, that a specific client is provided whose financial transactions are stored in an IMS hierarchical database, and whose travel and business information is stored in a DB2 relational database travel and business trip information is stored. Prior to the present invention, answering questions such as determining what financial transactions are associated with the client for three specific business trips could not be done unless the data from IMS and DB2 databases are brought together in a third relational data store that implements the appropriate metadata relations that enable the aforementioned relational query. By using the DSM Data Mediator Services) for the virtual database of the present invention, the SDO that acts as a facade for financial records in IMS and another SDO that acts as a facade for travel/business trip information are present in the virtual database's DSM. Like any other relational database, the DSM cannot support the queries against the many-to-many relationship scheme that exists between these two example SDOs. The DSM, like any other relational database management system will support the creation of an "associative table" that is commonly used to resolve many to many relationships. Unlike traditional relational database management systems, the virtual database's DSM will, via its metadata cache, support the creation of the associative table and transparently support the query of joins between these two SDOs via an associative table setup by the virtual database.

Figure 4:
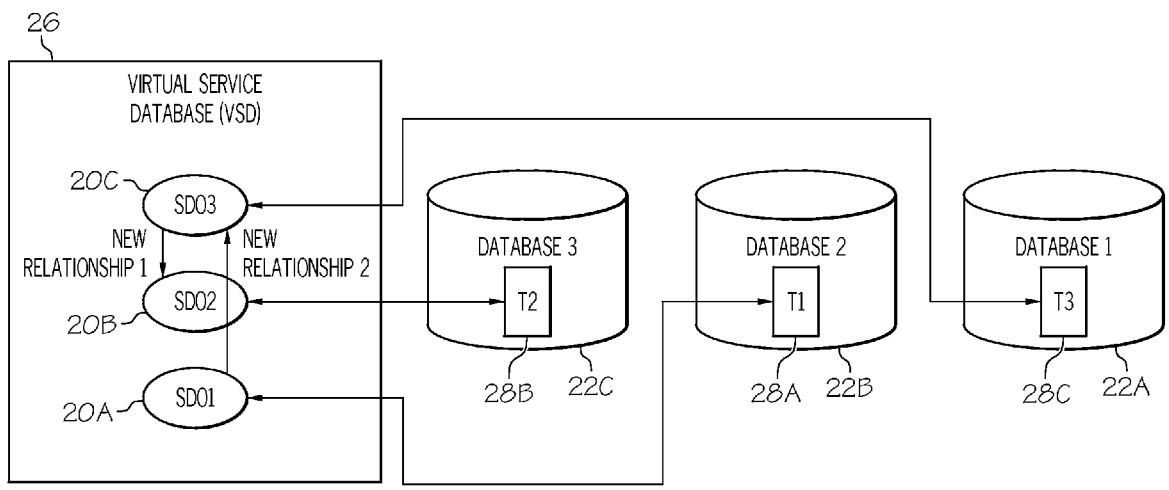
FIG. 4 depicts the provision of SDOs within a virtual container for database tables that are stored in multiple databases in accordance with the present invention

FIG. 4 depicts the provision of SDOs 20A-C within a virtual service database 26 (container) for database tables 28A-C that are stored in multiple databases 22A-C in accordance with the present invention. In this embodiment, SDOs 20A-C are provided and associated with database tables 28A-

C, and interrelated with each other in the same manner as described above. However, as can be seen, database tables 28A-C are stored among a plurality of databases 22A-C. This is shown to demonstrate the flexibility of the present invention, as well as how data from multiple databases 22A-C can be interrelated within a single virtual container 26 without having to move or otherwise manipulate the data. Regardless of the embodiment, the interrelated SDOs 20A-C within virtual container 26 represent a virtual database or VBPM that requires little hardware and data manipulation.

Figure 5:
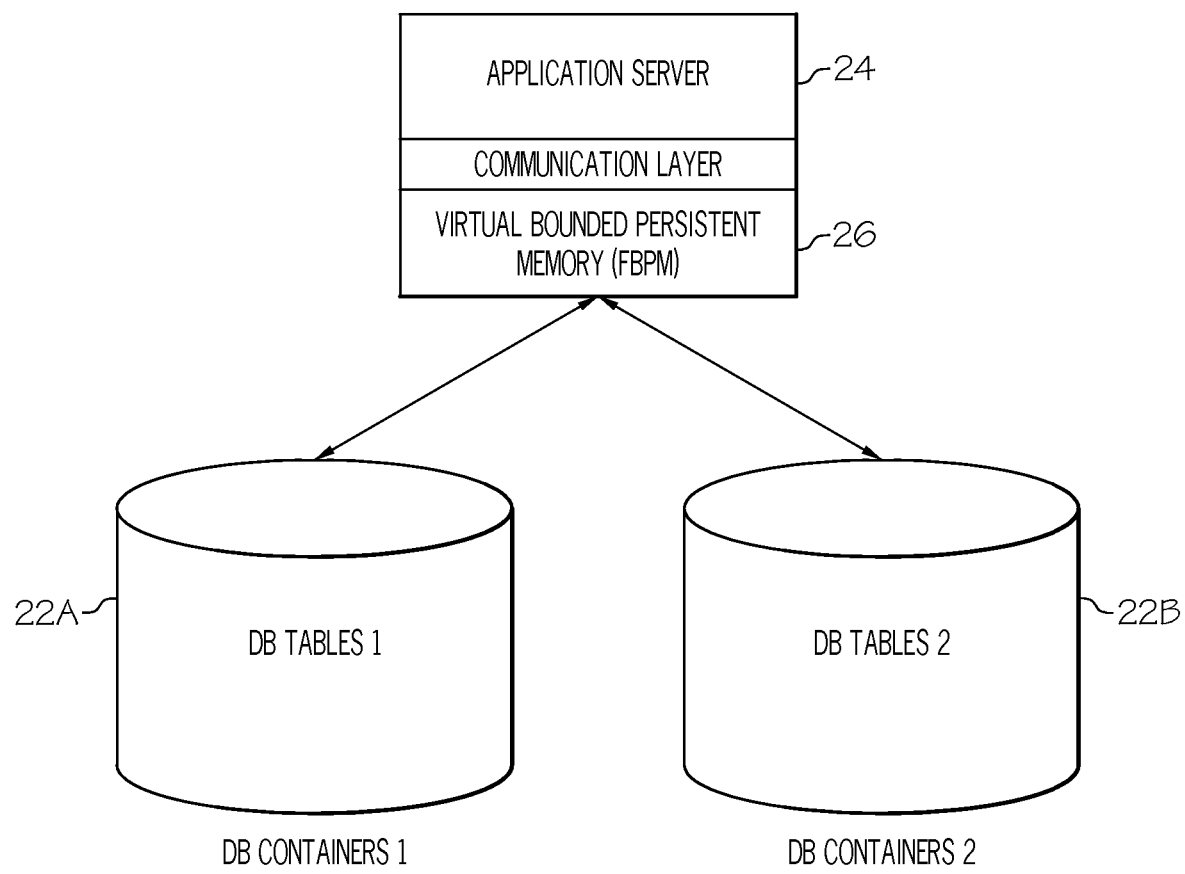
FIG. 5 depicts a database architecture achieved when SDOs are combined with the Virtual Bounded Persistent Memory (VBPM) of the present invention.

FIG. 5 depicts a database architecture achieved when SDOs are combined with the VBPM 26 of the present invention. As can be seen, under this architecture, multiple databases and/or other data storage units can be made to appear as a single data store that exists in virtual space (i.e., a virtual database). This virtual database can be queried using standard SQL queries via an interface.

II. Computerized Implementation

Figure 6:
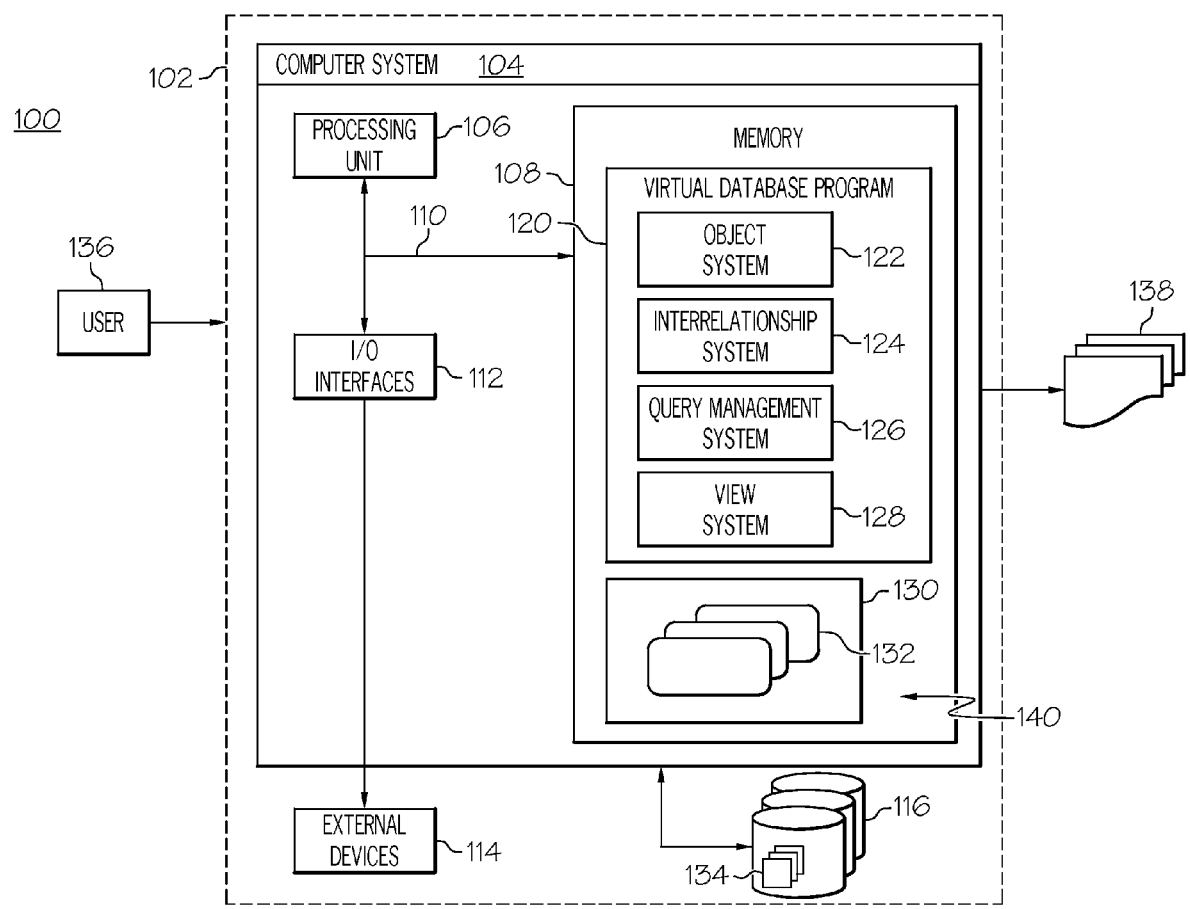
FIG. 6 depicts a computerized system for generating a virtual database in accordance with the present invention.

FIG. 6 depicts a computerized implementation 100 for generating a virtual database in accordance with the present invention. As depicted, implementation 100 includes a computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to generate virtual databases.

As shown, computer system 104 includes a processing unit 106, a memory 108, a bus 110, and input/output (I/O) interfaces 112. Further, computer system 104 is shown in communication with external I/O devices/resources 114 and fixed storage system(s) 116. In general, processing unit 106 executes computer program code, such as virtual database program 120, which is stored in memory 108 and/or fixed storage system(s) 116. While executing computer program code, processing unit 106 can read and/or write data to/from memory 108, fixed storage system(s) 116, and/or I/O interfaces 112. Bus 110 provides a communication link between each of the components in computer system 104. External devices 114 can comprise any devices (e.g., keyboard, pointing device, display, etc.) that enable a user to interact with computer system 104 and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process steps of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or fixed storage system(s) 116 can comprise any combination of various types of data storage and/or transmission media that reside at one or more physical locations. Further, I/O interfaces 112 can comprise any system for exchanging information with one or more external devices 114. Still further, it is understood that one or more additional components (e.g., system software, math co-processing unit, etc.) not shown in FIG. 6 can be included in computer system 104. However, if computer system 104 comprises a handheld device or the like, it is understood that one or more external devices 114 (e.g., a display) and/or fixed storage system(s) 116 could be contained within computer system 104, not externally as shown.

Fixed storage system(s) 116 can be any type of systems (e.g., databases) capable of providing storage for database tables 134, etc. To this extent, fixed storage system(s) 116 could each include one or more storage devices, such as magnetic disk drives or optical disk drives. Although not shown, additional components, such as cache memory, communication systems, system software, etc., may be incorporated into computer system 104.

Shown in memory 108 of computer system 104 is virtual database program 120, which includes object system 122, interrelationship system 124, query management system 126, and view system 128. These systems provide the functionality of the present invention discussed above. It should be understood, however, that the same functionality could be provided with a different configuration of systems than is shown in FIG. 6.

Under the present invention, a user/administrator 136 will leverage virtual database program 120 to generate a virtual database 140 based on database tables 134 using corresponding SDOs 132 that are interrelated within in a virtual container 130. User 136 can further leverage virtual database program 120 to query virtual database 140 and/or obtain views 138 of the corresponding data. Specifically, user 136 will use object system 122 to create, deploy, or otherwise provide one or more SDOs 132 for each database table 134 that is desired to be represented in virtual database 140. This operation can include any known techniques for creating or providing SDOs 132 (e.g., under the SDO specification). Once SDOs 132 are provided within virtual container 130, interrelationship system 124 will be to interrelate SDOs 132 as desired to yield virtual database 140. In a typical embodiment, at least two SDOs will be interrelated. In any event, once virtual database 140 has been generated in this manner, user can query the same using standard SQL queries. Such queries will be received and processed by query management system 126. Specifically, query management system 126 will interpret the query and manipulate, process, and/or retrieve the data from database tables 134 based thereon. To this extent, query management system 126 also provides an interface for receiving the queries and otherwise interfacing with user 136. In addition, view system 128 can be used to generate any desired views 138 of the data (e.g., as requested by user).

While shown and described herein as a method and system for providing generating a virtual database, it is understood that the invention further provides various alternative embodiments. For example, in one embodiment, the invention provides a computer-readable/useable medium that includes computer program code to enable a computer infrastructure to generate a virtual database. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 6) and/or fixed storage system(s) 116 (FIG. 6) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to generate a virtual database. In this case, the service provider can create, maintain, support, etc., a computer infrastructure, such as computer infrastructure 102 (FIG. 6) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for generating a virtual database. In this case, a computer infrastructure, such as computer infrastructure 102 (FIG. 6), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 104 (FIG. 6), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims. For example, although the illustrative embodiments show databases 22A-C, the present invention could actually be used in conjunction with any type of fixed storage media.

We claim:

1. A method for generating a virtual database, comprising:
    providing, in a virtual container, Service Data Objects (SDOs) corresponding to each of a plurality of database tables stored in a memory;
    forming a Virtual Bounded Persistent Memory (VBPM) instance, the forming including interrelating at least two of the SDOs in the virtual container,
    wherein the VBPM is generated on demand and removed on demand, wherein the forming further includes interrelating at least three of the SDOs in the virtual container, wherein at least one SDO is related to at least one other SDO and is not related to at least one other SDO;
    receiving a query for the database tables in an interface for the virtual container; and
    on a processor, executing the query against the VBPM instance, wherein the executing comprises manipulating data contained in at least one of the plurality of database tables using the SDOs in response to the query, without passing the query through to the memory,
    wherein the VBPM further includes data mediator services which support creation of an associative table for resolving many-to-many relationships and supporting query of joins between the plurality of SDOs interrelated in the virtual container.

2. The method of claim 1, wherein the query is a structured query language (SQL) query.

3. The method of claim 1, wherein the plurality of database tables are stored among a plurality of databases.

4. The method of claim 1, wherein the plurality of database tables comprises a relational database table and a hierarchical database table.

5. The method of claim 1, wherein at least one of the at least two SDOs is associated with one of the plurality of database tables.

6. The method of claim 1, wherein at least one of the at least two SDOs is associated with two or more of the plurality of database tables.

7. A computer system for generating a virtual database, comprising:
    at least one processing unit;
    a memory operably associated with the at least one processing unit; and
    a Virtual Bounded Persistent Memory (VBPM) instance generating system stored in a memory which when executed by the at least one processing unit, generates a VBPM, the generating system comprising:
        a system for providing, in a virtual container, Service Data Objects (SDOs) corresponding to each of a plurality of database tables;
        a system for forming a Virtual Bounded Persistent Memory (VBPM) instance, the forming including interrelating at least two of the SDOs in the virtual container, wherein the forming further includes interrelating at least three of the SDOs in the virtual container, wherein at least one SDO is related to at least one other SDO and is not related to at least one other SDO,
        wherein the VBPM is generated on demand and removed on demand;
        a system for receiving a query for the database tables in an interface for the virtual container; and
        a system for executing the query against the VBPM instance, wherein the system for executing comprises a system for manipulating data contained in at least one of the plurality of database tables using the SDOs in response to the query, without passing the query through to the plurality of database tables,
        wherein the VBPM further includes data mediator services which support creation of an associative table for resolving many-to-many relationships and supporting query of joins between the plurality of SDOs interrelated in the virtual container.

8. The computer system of claim 7, wherein the query is a structured query language (SQL) query.

9. The computer system of claim 7, wherein the plurality of database tables are stored among a plurality of databases.

10. The computer system of claim 7, wherein the plurality of database tables comprises a relational database table and a hierarchical database table.

11. The computer system of claim 7, wherein at least one of the at least two SDOs is associated with one of the plurality of database tables.

12. The computer system of claim 7, wherein at least one of the at least two SDOs is associated with two or more of the plurality of database tables.

13. A computer-readable storage medium storing computer instructions, which when executed, enables a computer system to generate a virtual database, the generating comprising:
   providing, in a virtual container, Service Data Objects (SDOs) corresponding to each of a plurality of database tables;
   forming a Virtual Bounded Persistent Memory (VBPM) instance, the forming including interrelating at least two of the SDOs in the virtual container, wherein the forming further includes interrelating at least three of the SDOs in the virtual container, wherein at least one SDO is related to at least one other SDO and is not related to at least one other SDO,
      wherein the VBPM is generated on demand and removed on demand;
   receiving a query for the database tables in an interface for the virtual container;
   executing the query against the VBPM instance; and
   manipulating data contained in at least one of the plurality of database tables using the SDOs in response to the query, without passing the query through to the plurality of database tables,
   wherein the VBPM further includes data mediator services which support creation of an associative table for resolving many-to-many relationships and supporting query of joins between the plurality of SDOs interrelated in the virtual container.

14. The computer-readable storage medium of claim 13, wherein the query is a structured query language (SQL) query.

15. The computer-readable storage medium of claim 13, wherein the plurality of database tables are stored among a plurality of databases.

16. The computer-readable storage medium of claim 13, wherein the plurality of database tables comprises a relational database table and a hierarchical database table.

17. The computer-readable storage medium of claim 13, wherein at least one of the at least two SDOs is associated with two or more of the plurality of database tables.

18. A method for deploying an application for generating a virtual database, comprising:
   providing a computer infrastructure being operable to:
      provide, in a virtual container, Service Data Objects (SDOs) corresponding to each of a plurality of database tables stored in a memory;
      form, in a virtual container, a Virtual Bounded Persistent Memory (VBPM) instance, the forming including interrelating at least two of the SDOs, wherein the forming further includes interrelating at least three of the SDOs in the virtual container, wherein at least one SDO is related to at least one other SDO and is not related to at least one other SDO,
      wherein the VBPM is generated on demand and removed on demand;
      receive a query for the database tables in an interface for the virtual container;
      on a processor, execute the query against the VBPM instance; and
      manipulate data contained in at least one of the plurality of database tables using the SDOs in response to the query, without passing the query through to the plurality of database tables,
      wherein the VBPM further includes data mediator services which support creation of an associative table for resolving many-to-many relationships and supporting query of joins between the plurality of SDOs interrelated in the virtual container.

19. The method of claim 18, wherein the query is a structured query language (SQL) query.

20. The method of claim 18, wherein the plurality of database tables are stored among a plurality of databases.

21. The method of claim 18, wherein the plurality of database tables comprises a relational database table and a hierarchical database table.

22. A Virtual Bounded Persistent Memory (VBPM) instance comprising:
   a virtual container;
   a plurality of Service Data Objects (SDOs) corresponding to a plurality of database tables stored in the virtual container, wherein at least two of the SDOs are interrelated within the virtual container, forming the Virtual Bounded Persistent Memory (VBPM) instance, wherein the forming further includes interrelating at least three of the SDOs in the virtual container, wherein at least one SDO is related to at least one other SDO and is not related to at least one other SDO, wherein the VBPM is generated on demand and removed on demand, and further comprising:
      an interface for the virtual container for receiving a query for the plurality of database tables; and
      a processor for executing the query against the VBPM instance, wherein the executing includes manipulating data contained in at least one of the plurality of database tables using the SDOs in response to the query, without passing the query through to the plurality of database tables,
      wherein the VBPM further includes data mediator services which support creation of an associative table for resolving many-to-many relationships and supporting query of joins between the plurality of SDOs interrelated in the virtual container.

23. The Virtual Bounded Persistent Memory (VBPM) instance of claim 22, wherein the plurality of database tables are stored among a plurality of databases.

24. The Virtual Bounded Persistent Memory (VBPM) instance of claim 22, wherein the plurality of database tables comprises a relational database table and a hierarchical database table.

* * * * *